(12) United States Patent
Martinez et al.

(10) Patent No.: US 11,252,191 B2
(45) Date of Patent: Feb. 15, 2022

(54) VISUAL POLICY CONFIGURATION AND ENFORCEMENT FOR PLATFORM SECURITY

(71) Applicant: Dell Products L.P., Round Rock, TX (US)

(72) Inventors: Ricardo L. Martinez, Leander, TX (US); Justin W. Johnson, Austin, TX (US); Joshua N. Alperin, Round Rock, TX (US); Richard M. Tonry, Austin, TX (US); Nikolay Kalaichidi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 15/624,032

(22) Filed: Jun. 15, 2017

(65) Prior Publication Data
US 2018/0367568 A1 Dec. 20, 2018

(51) Int. Cl.
*H04L 29/06* (2006.01)
*G06F 21/00* (2013.01)
(Continued)

(52) U.S. Cl.
CPC .......... *H04L 63/20* (2013.01); *H04L 63/0272* (2013.01); *G06F 9/4401* (2013.01); *G06F 9/44505* (2013.01)

(58) Field of Classification Search
CPC .. H04L 63/20; H04L 63/0272; G06F 9/44505
See application file for complete search history.

(56) References Cited

U.S. PATENT DOCUMENTS 9,038,130 B2  5/2015  Gillon et al.
9,369,495 B2  6/2016  Gillon et al.
(Continued)

FOREIGN PATENT DOCUMENTS

WO   WO-2013059520 A1 * 4/2013 ........... G06F 21/554

OTHER PUBLICATIONS

Beatriz Gallego-Nicasio Crespo; "User Interface Harmonization for IT Security Management: User-Centered Design in the PoSecCo Project"; 2013 International Conference on Availability, Reliability and Security; Year: 2013 | Conference Paper | Publisher: IEEE; pp. 829-835 (Year: 2013).*

(Continued)

*Primary Examiner* — Shewaye Gelagay
*Assistant Examiner* — Courtney D Fields
(74) *Attorney, Agent, or Firm* — Terrile, Cannatti & Chambers; Stephen A. Terrile

(57) ABSTRACT

A system, method, and computer-readable medium are disclosed for performing a platform security operation, comprising: presenting a platform security user interface, the platform security user interface including a plurality of security blocks, each of the plurality of security blocks corresponding to a particular security policy function configuring a security policy via the platform security user interface, the configuring comprising combining a set of the security blocks according to a desired security function; converting the set of security blocks to information representing the security policy; and, deploying the security policy to an information handling system.

18 Claims, 9 Drawing Sheets

(51) Int. Cl.
  *G06F 21/62* (2013.01)
  *G06F 9/445* (2018.01)
  *G06F 9/4401* (2018.01)

(56) References Cited

U.S. PATENT DOCUMENTS

| | | | |
|---|---|---|---|
| 2010/0146582 A1* | 6/2010 | Jaber | G06F 21/6218 726/1 |
| 2015/0019850 A1* | 1/2015 | Rivera | G06F 21/572 713/1 |
| 2015/0089575 A1* | 3/2015 | Vepa | H04L 41/0893 726/1 |
| 2016/0246987 A1 | 8/2016 | Gillon et al. | |

OTHER PUBLICATIONS

James A. Hoagland et al., Security Policy Specification Using a Graphical Approach, Technical Report CSE-98-3, Jul. 22, 1998, https://arxiv.org/pdf/cs/9809124v1.pdf.
Microsoft, Set Security Policies in Azure Security Center, May 8, 2017, pp. 56-62 https://docs.microsoft.com/en-us/azure/security-center/security-center-policies.
https://www.researchgate.net/figure/220579198_fig3_Figure-19-A-visual-language-for-specifying-security-policy, printed May 24, 2017.
Terri Oda et al., Visual Security Policy for the Web, Proceedings of the 5th USENIX Conference on Hot Topics in Security, Aug. 2010, https://www.usenix.org/legacy/event/hotsec10/tech/full_papers/Oda.pdf—web-based xml policies, not graphical/visual.
Wenjuan Xu et al., Visualization Based policy Analysis: Case Study in SELinux, SACMAT '08, Jun. 11-13, 2008, http://sefcom.asu.edu/publications/visualization-based-policy-sacmat2008.pdf.
https://seanssecurity.wordpress.com/tag/visual-policy-manager/, printed May 24, 2017.
M.E. Lesk et al., Lex—A Lexical Analyzer Generator, printed May 18, 2017, http://dinosaur.compilertools.net/lex/.
David Cary, Minimal Instruction Set, printed May 18, 2017 http://david.carybros.com/html/minimal_instruction_set.html.
Jiewen Yao et al., Intel, A Tour Beyond BIOS Supporting an SMM Resource Monitor Using the EFI Developer Kit II—White Paper, Jun. 2015, https://firmware.intel.com/sites/default/files/resources/A_Tour_Beyond_BIOS_Supporting_SMM_Resource_Monitor_using_the_EFI_Developer_Kit_II.pdf.

* cited by examiner

VISUAL POLICY CONFIGURATION AND ENFORCEMENT FOR PLATFORM SECURITY

BACKGROUND OF THE INVENTION

Field of the Invention

The present invention relates to information handling systems. More specifically, embodiments of the invention relate to performing platform security operations.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide a plurality of information handling systems into an information technology (IT) environment. One issue relating to IT environments relates to providing security across the various information handling systems in the IT environment. This is especially true with IT environments comprising relatively large numbers of information handling systems (e.g., greater than 100).

SUMMARY OF THE INVENTION

A system, method, and computer-readable medium are disclosed for performing a platform security operation. In various embodiments, the platform security operation enables configuration of platform security policies via a visual representation of the platform security policies. In certain embodiments, the visual representation of the platform security policies use block-level programming such as "if . . . do" type block level programming statements. In various embodiments, the platform security operation provides scripting logic that can be consumed by low resource environments and deployed via variable, attribute and/or setting methodologies. In various embodiments the platform security operation provides BIOS interpretation, enforcement and/or control of dynamic policies.

Such platform security operations provide a full solution to a user for configuring dynamic security policies with complex logic conditions that are enforced by the privilege and security of the BIOS. In various embodiments, triggers and actions may be defined by the platform security operation for user manipulation of security policies. In various embodiments, logic for the dynamic security policy is generated by the platform security operation and deployed to the BIOS of information handling system. A pool of available triggers and actions can be defined by a user of the platform security system for end user manipulation of security policies. The platform security operation (and point of contact (PoC)) include options for triggering AND and/or OR operations interpreting and multiple actions per trigger conditional. Thus, the platform security operation enables connected, flexible, and logical policy definition which may be visually configured.

More specifically, in various embodiments, the platform security operation enables visual programming of security policies for information handling systems to support flexible cause-effect, trigger-action and/or incident-response policies. In various embodiments, the platform security operation provides an efficient scripting language based on minimal string opcodes for remote deployment, storage, and interpreting of conditional logic in a low-resource environment such as uniform extensible firmware interface (UEFI) system management mode (SMM). In various embodiments, the platform security operation uses SMM as a reference monitor for trigger-action behaviors to interpret policies and physical system state to perform actions supporting operating system (OS) agnostic runtime, boot time, and pre-OS environments. In various embodiments, the platform security operation uses BIOS to maintain persistence for security policies in non-volatile random access memory (NVRAM) enforced via logical parsing. In various embodiments, the platform security operation provides a bi-directional policy interface for reading policy operational capabilities from BIOS for limiting customer policy creation. In various embodiments, the platform security operation enables application of security policies to physical triggers (e.g., lid open, etc.) and logical or physical controls (e.g., power off, set password) vs. pure controlled security.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various aspects of the present disclosure include an appreciation that it can be desirable to implement platform security policies as a large (and growing) collection of discrete switches and settings stored within and enforced via a basic input output system (BIOS) of the information handling systems. These settings can be conveyed to a user and controlled through various BIOS setup menus and/or manageability tools. Implementing platform security polices via such a paradigm allows the customer to implement specific static controls (e.g. disable USB ports, set BIOS password). Various aspects of the disclosure include an appreciation that these controls may not be organized or connected at either a user interface (UI)/configuration level or the enforcement level so setting context-aware dynamic policies has not been possible.

Various aspects of the present disclosure include an appreciation that BIOS has access to and control of many system settings, triggers, and resources that could potentially be combined to establish powerful and dynamic platform security policies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
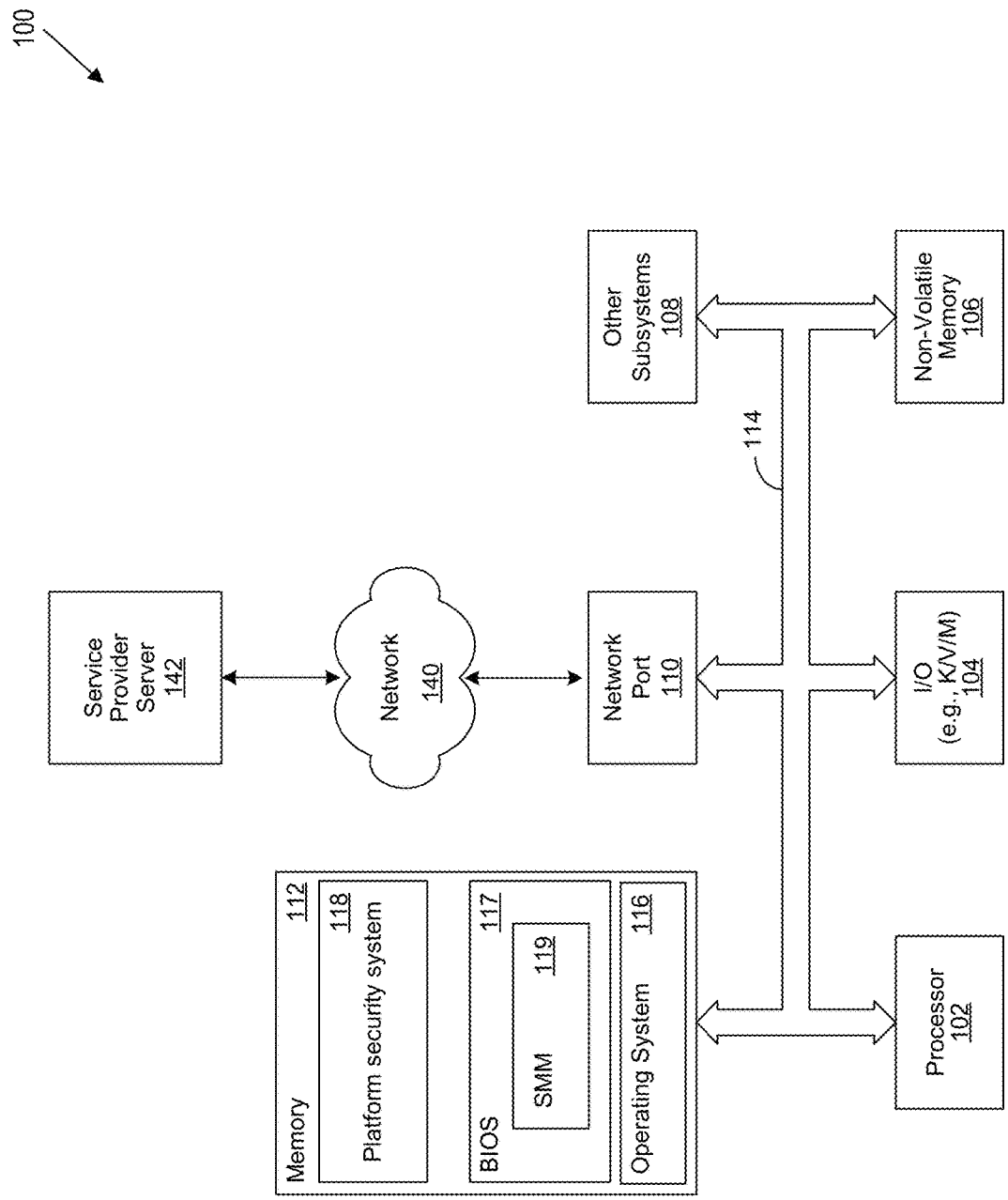
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116, basic input/output system (BIOS) 117 and in various embodiments may also comprise platform security system 118. In various embodiments, the BIOS 117 includes a SMM module 119.

The platform security system 118 performs a platform security operation. The platform security operation improves processor efficiency (and thus the efficiency of the information handling system 100) by enabling BIOS interpretation, enforcement and/or control of dynamic policies. As will be appreciated, once the information handling system 100 is configured to perform the platform security operation, the information handling system 100 becomes a specialized computing device specifically configured to perform the platform operation and is not a general purpose computing device. Moreover, the implementation of the platform security operation on the information handling system 100 improves the functionality of the information handling system and provides a useful and concrete result of enabling BIOS interpretation, enforcement and/or control of dynamic policies within an information handling system.

In various embodiments, the platform security operation enables configuration of platform security policies via a visual representation of the platform security policies. In certain embodiments, the visual representation of the platform security policies use block-level programming such as "if . . . do" type block level programming statements. In various embodiments, the platform security operation provides scripting logic that can be consumed by low resource environments and deployed via variable, attribute and/or setting methodologies. For the purposes of this disclosure a low resource environment is any context with limited processor performance or limited memory (such as random access memory RAM)) availability. SMM is an example of a low resource environment. A low-cost microcontroller is another example of a low resource environment. Variable, attribute and settings all refer to small areas of non-volatile RAM (NVRAM) that can be manipulated by software that are used to transmit or store information in the BIOS or modify configuration of the BIOS. Variable, attribute, setting are just examples or instances of this type of mechanism. In certain embodiments, the low resource environment includes relatively small areas of memory (such as NVRAM) as compared to storage that holds program code such as read only memory (ROM). In various embodiments the platform security operation provides BIOS interpretation, enforcement and/or control of dynamic policies.

Such platform security operations provide a full solution to a user for configuring dynamic security policies with complex logic conditions that are enforced by the privilege and security of the BIOS. In various embodiments, triggers and actions may be defined by the platform security operation for user manipulation of security policies. In various embodiments, logic for the dynamic security policy is generated by the platform security operation and deployed to the BIOS of information handling system. A pool of available triggers and actions can be defined by a user of the platform security system for end user manipulation of security policies. The platform security operation (and point of contact (PoC)) include options for triggering AND and/or OR operations interpreting and multiple actions per trigger conditional. Thus, the platform security operation enables connected, flexible, and logical policy definition which may be visually configured.

More specifically, in various embodiments, the platform security operation enables visual programming of security policies for information handling systems to support flexible cause-effect, trigger-action and/or incident-response policies. In various embodiments, the platform security operation provides an efficient scripting language based on minimal string opcodes for remote deployment, storage, and interpreting of conditional logic in a low-resource environment such as uniform extensible firmware interface (UEFI) system management mode (SMM). For the purposes of this disclosure a uniform extensible firmware interface may be defined as an interface between the operating system 116 and the BIOS 117 of the information handing system 100. Additionally, the UEFI provides support for remote diagnostics and repair of the information handling system even if no operating system is installed. For the purposes of this disclosure, system management mode may be defined as an operating mode of the BIOS where normal execution of the operating system is suspended and a special purpose operating mode for handling system wide functions such as power management, system hardware control as well as manufacturer specific designed operations is instantiated.

In various embodiments, the platform security operation uses SMM as a reference monitor for trigger-action behaviors to interpret policies and physical system state to perform actions supporting operating system (OS) agnostic runtime, boot time, and pre-OS environments. In various embodiments, the platform security operation uses BIOS to maintain persistence for security policies in non-volatile random access memory (NVRAM) enforced via logical parsing. In various embodiments, the platform security operation provides a bi-directional policy interface which allows software, a customer, and/or an end user to understand the specific settings available on the system that is being configured and filter only those available. For example, if the system does not have any USB ports then there would not be any option to "Disable USB" as an action in the configuration. Thus the policy interface simplifies reading policy operational capabilities of BIOS. In various embodiments, the platform security operation enables application of security policies to physical triggers (e.g., lid open, etc.) and logical or physical controls (e.g., power off, set password, e controlled security.

In various embodiments, the triggers include one or more of a lid open/close trigger, a network interface controller (NIC) link state trigger, an AC power presence trigger, a power button trigger, a power button override trigger, a hotkey trigger, a dock/undock trigger, a camera on/off trigger, a chassis intrusion trigger, a service mode jumper trigger, a password jumper trigger, a fan disconnected trigger, a panel disconnected trigger, a memory configuration change trigger, an real time clock (RTC) reset trigger, a battery charging trigger, a battery authentication failed trigger, a security slot cable (e.g., a Kensington security slot) removed trigger, a boot failed trigger, an active management technology (AMT) provisioning change trigger, a geofence in/out trigger and a system movement trigger (which may be based upon gyro detection or accelerometer detection). In various embodiments, actions include one or more of a power on action, a power off action, a halt at boot action, a halt on boot with password option, a halt in SMM action, an ignore trigger button action, a boot to setup action, a boot to e diagnostics action, an audible alert action, a data wipe action, a trusted platform module (TPM) clear action, a change splash screen action, a turn off panel action, an on screen display (e.g., an init 10 display) action, a log even action a graceful shutdown ancation and a force reboot action.

Figure 2:
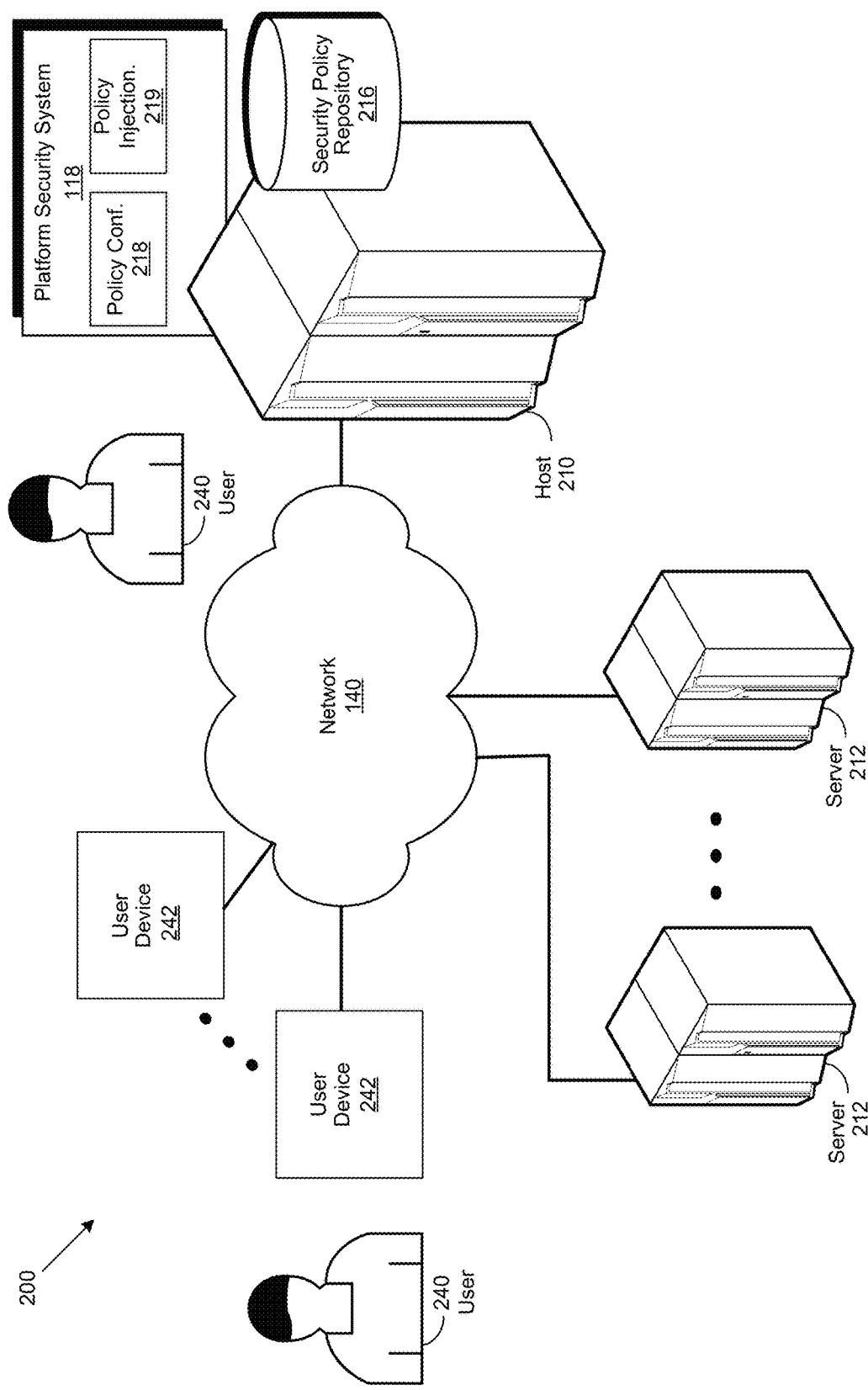
FIG. 2 shows a block diagram of an IT environment which includes a platform security system.

FIG. 2 is a simplified block diagram of an information technology environment 200 which includes a platform security system 118. In various embodiments, the IT environment 200 includes a host system 210 and at least one server type information handling system 212. The host system 210 executes the platform security system 118 on a hardware processor. The platform security system 118 interacts with a security policy repository 216. In certain embodiments, the platform security system 118 includes a policy configuration module 218 and a policy injection module 219. In certain embodiments, the security policy repository is included within the security policy system 118. It will be appreciated that the host system 210 may be an information handling system.

In various embodiments, the IT environment further includes at least one user device 242. As used herein, a user device 242 refers to an information handling system such as a personal computer, a laptop computer, a tablet computer, a personal digital assistant (PDA), a smart phone, a mobile telephone, or other device that is capable of communicating and processing data. In various embodiments, the user device 242 is used to exchange information between the user 240 and either or both a server system 212 and a host system 210 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention. In certain embodiments, a user 240 may interact directly with the platform security system 218.

Figure 3:
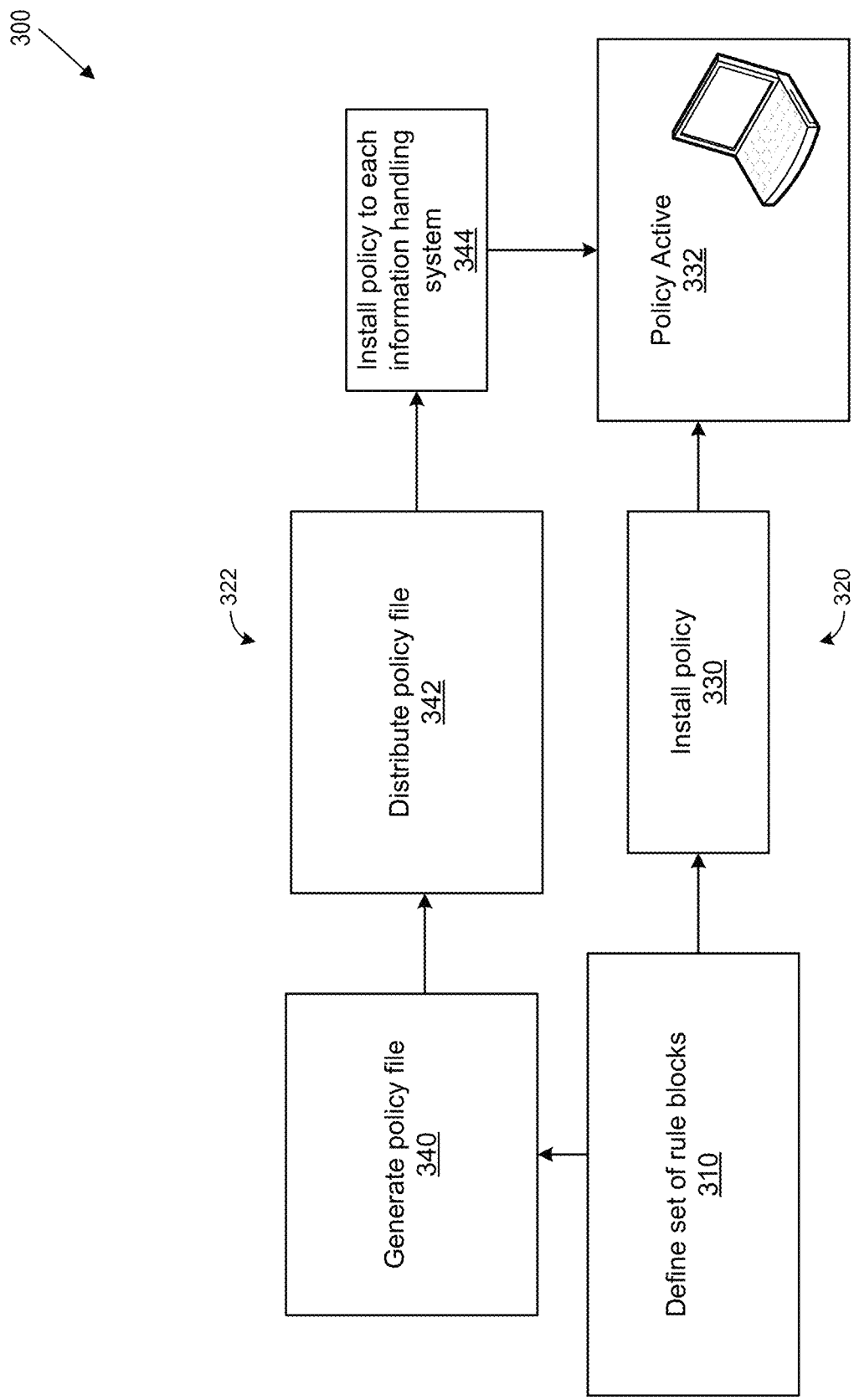
FIG. 3 shows a flow chart of the operation of a platform security deployment operation.

FIG. 3 shows a flow chart of the operation of a platform security deployment operation 300. More specifically, the platform security deployment operation 300 starts at step 310 with a user defining a set of rule blocks to create a security policy. In various embodiments, the rule blocks correspond to discrete security policy operations. Next, the security policy may be deployed via a local deployment 320 or an IT deployment 322. When deploying via the local deployment 320, the platform security deployment operation 320 proceeds to step 330 where the policy is installed to an information handling system. In certain embodiments, the policy is installed to a BIOS based SMM security monitor. Next, at step 334 the security policy is active and the information handling system is protected.

When deploying via the IT deployment 322, the platform security deployment operation 300 proceeds to step 340 where a policy file representing the policy which was defined with the set of rule blocks is generated. Next, at step 342 the policy file is distributed to a plurality of information handling systems (e.g., server systems 212 and/or user devices 242) across the IT environment 200. It will be appreciated that the plurality of information handling systems may be some or all of the information handling systems within the IT environment 200. Next, at step 344, the policy file is used to install the policy to each of the plurality of information handling systems. In certain embodiments, the policy is installed to a BIOS based SMM security monitor for some or all of the plurality of information handling systems. Next, at step 324 the security policy is active and the plurality of information handling systems is protected.

Figure 4:
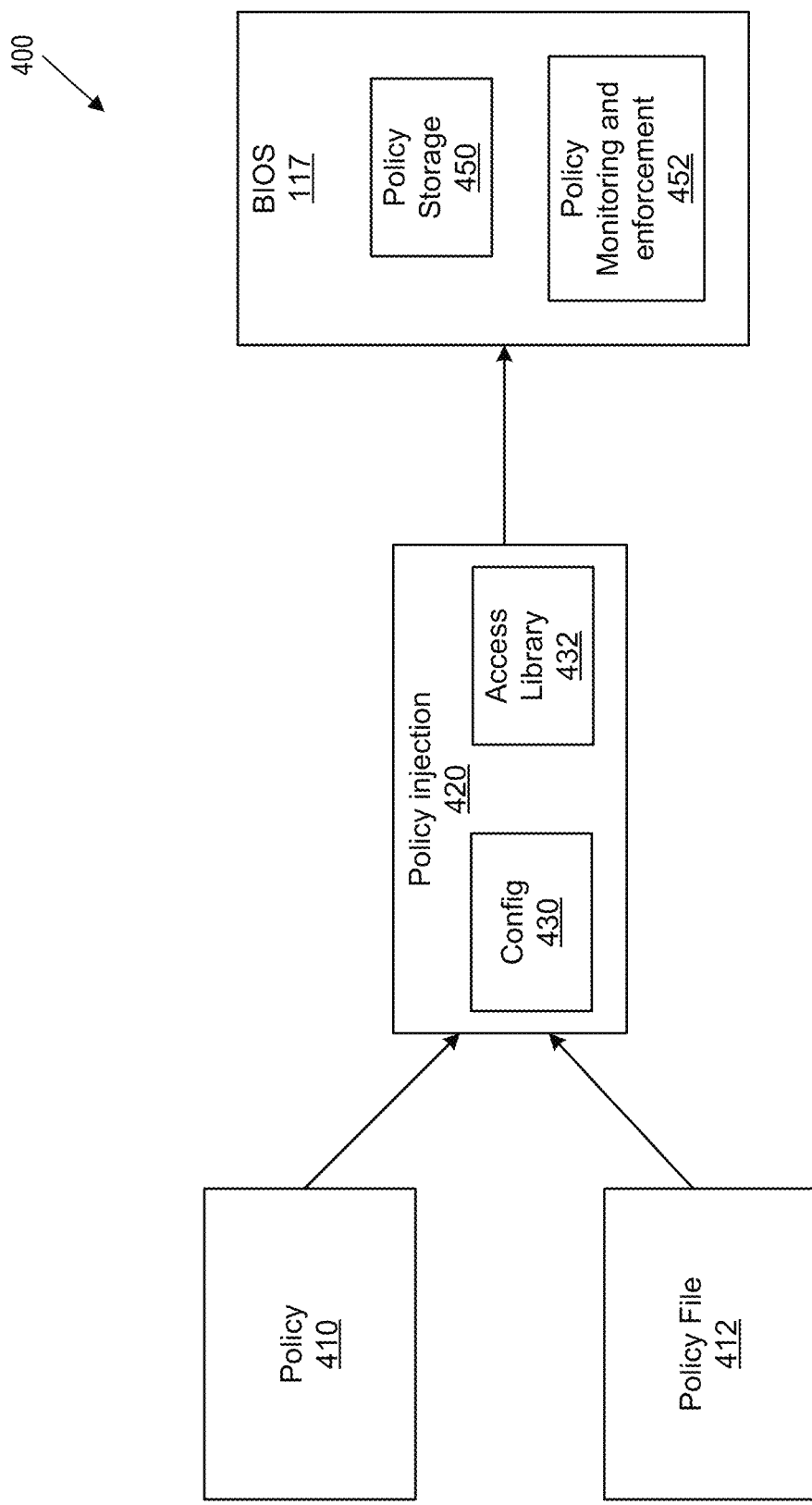
FIG. 4 shows a flow chart of the operation of a policy injection operation.

FIG. 4 shows a block diagram of the operation of a policy injection operation 400. The policy injection operation 400 includes two options for injecting a security polity to an information handling system, a natively spawned option and a manual option. With the natively spawned option, a policy 410 is automatically injected into the BIOS of the information handling system. In certain embodiments, the policy is generated via a block building security policy interface. With the manual option, the policy is injected into the BIOS or the information handling system by importing a policy file 412. In certain embodiments, the policy file is imported via a command-line type interface. In certain embodiments, the policy is generated via a block building security policy interface.

With either natively spawned option or the manual option, the policy is provided to a policy injection module 420. In certain embodiments, the policy injection module 420 includes a configuration tool 430. In certain embodiments, the policy injection module 420 includes a kernel mode driver or BIOS access library 432.

Next, the policy injection module 420 injects the policy to the BIOS 117 of the information handling system 100. In certain embodiments, the policy is provided via a BIOS application program interface. In certain embodiments, the BIOS 117 includes a policy storage portion 450 where the policy is stored. In certain embodiments, the policy storage portion 450 includes NVRAM. In certain embodiments, the BIOS includes a policy monitoring and enforcement portion 452. In certain embodiments, the policy monitoring and enforcement portion 452 includes a manufacturer specific operation of a SMM of the BIOS.

Figure 5:
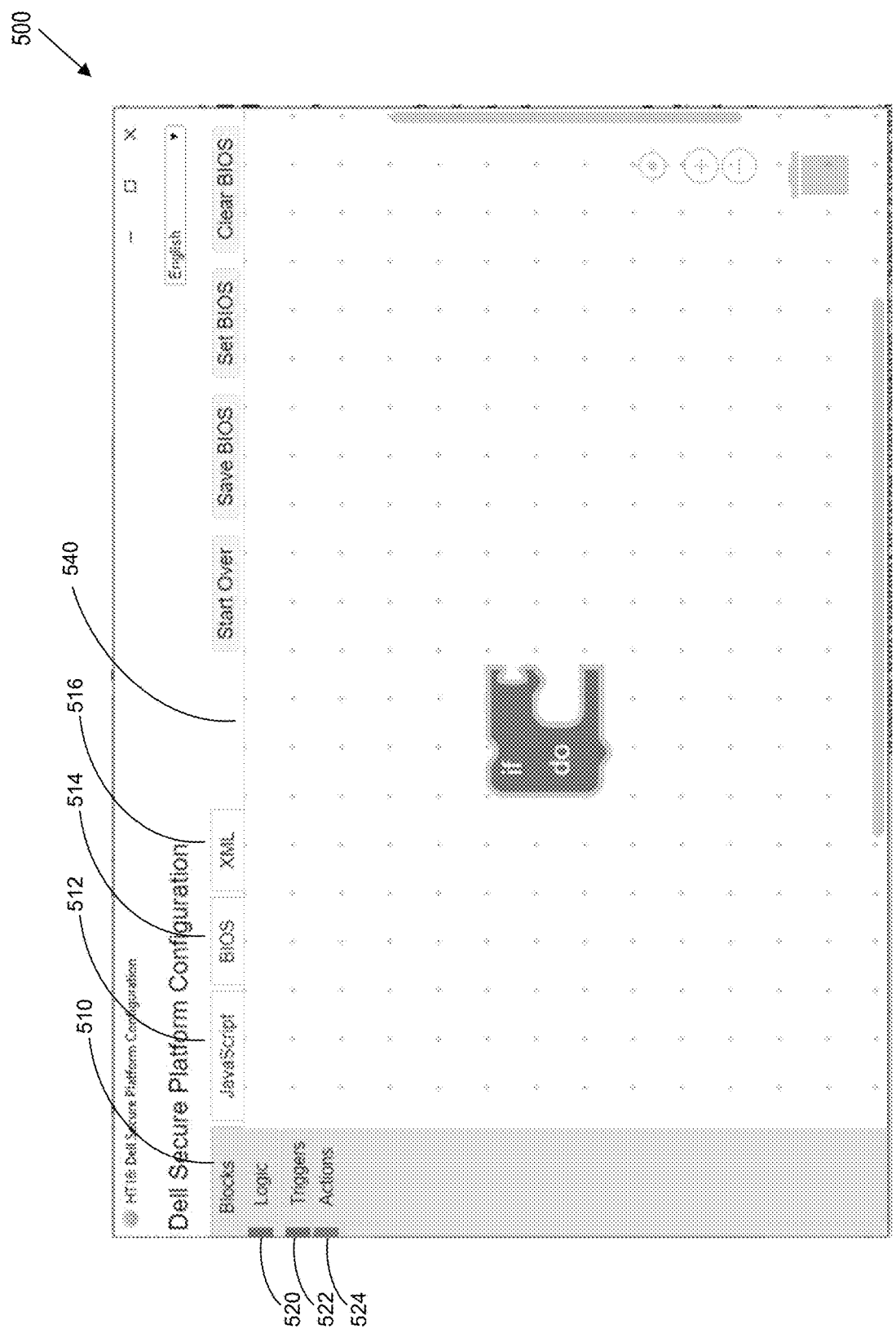
FIG. 5 shows an example screen presentation of a platform security user interface.

FIG. 5 shows an example screen presentation 500 of a platform security user interface. The screen presentation provides a user interface for the policy configuration module. The screen presentation 500 includes a blocks tab 510, a JavaScript tab 512, a BIOS tag 514 and an XML tag 516. When the block tab 510 is selected (as in the example screen presentation 500) a plurality of platform security control options are presented. In various embodiments, the plurality of platform security control options includes a logic option 520, a triggers option 522 and an actions option 524. When the logic option 522 is selected, logic operations such as "if do", "do while" and "if this and that or that" are presented that may be selected by a user.

When the logic option 520 is selected (as in the example screen presentation 500) a user is presented with a plurality of logic option selections. Selecting a logic option from the plurality of logic option selections presents the logic option in a workspace 540 of the screen presentation 500.

Figure 6:
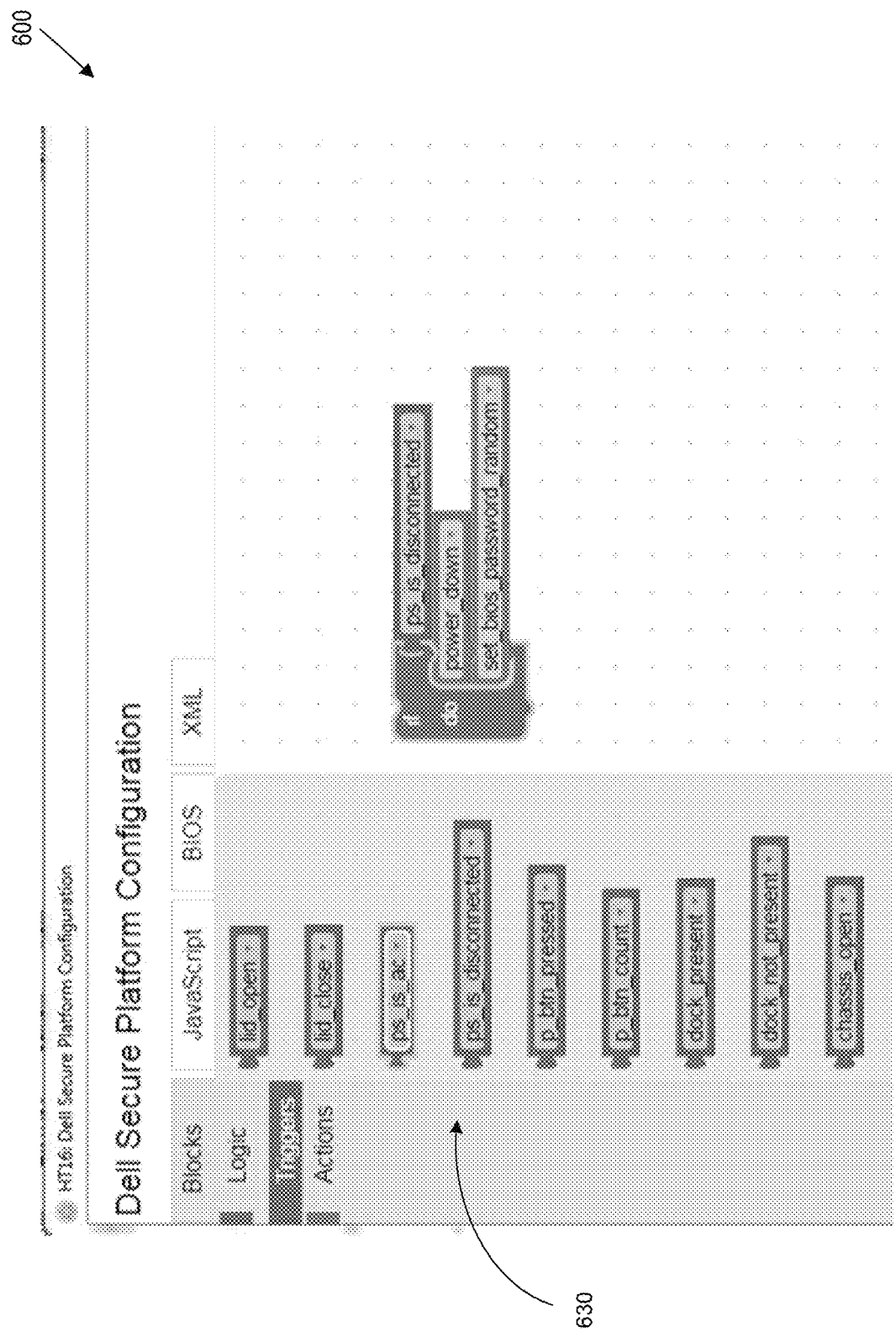
FIG. 6 shows another example screen presentation of a platform security user interface.

FIG. 6 shows an example screen presentation 600 of a platform security user interface. When the triggers option 522 is selected (as in the example screen presentation 600), the user is presented with a plurality of trigger option selections 630. Selecting a trigger action from the plurality of trigger options selections presents a trigger option in the workspace 540.

Figure 7:
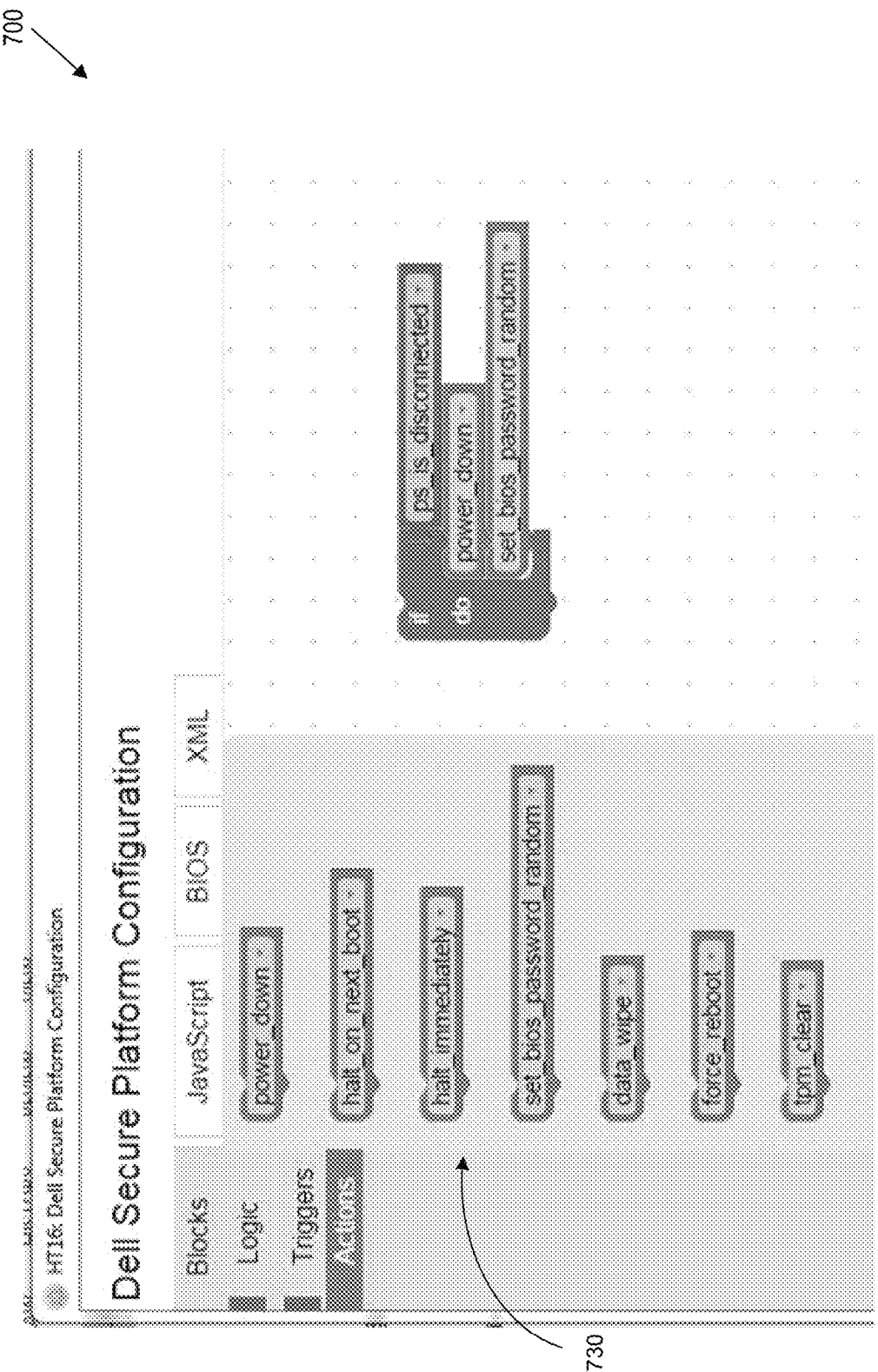
FIG. 7 shows example screen presentations of a platform security operation.

FIG. 7 shows another example screen presentation 700 of a platform security user interface. When the actions option 524 is selected (as in the example screen presentation 700), the user is presented with a plurality of actions option selections that correspond to the previously selected trigger option. Selecting an action option from the plurality of action option selections 730 presents the action option in the workspace 540 of the screen presentation 700 to provide a visual security policy. With the platform security user interface, triggers visually combine with actions to enable a user to generate security policies. In certain embodiments, the presentation of the triggers and actions are presented as "if . . . do" type programming statements. I.e., when an event occurs (the if statement) than perform a certain operation or operations (the do statement).

More specifically, the example screen presentation 700 shows an anti-theft security policy example. With this example, a user executes the policy configuration module (which may be a web application) to define a policy by selecting user friendly, easy to use blocks presented within the platform security user interface. With the example shown, the anti-theft security policy is configured as "if my power supply is disconnected, then power down the system and set a random BIOS password". The user then actuates a button (e.g., a Set BIOS button) in the user interface to install the security policy to the BIOS of the information handling system, effectively arming the policy. The BIOS performs the actions (e.g., via the SMM) defined in the policy whenever the power supply is disconnected, independent of operating system or boot state.

Figure 8:
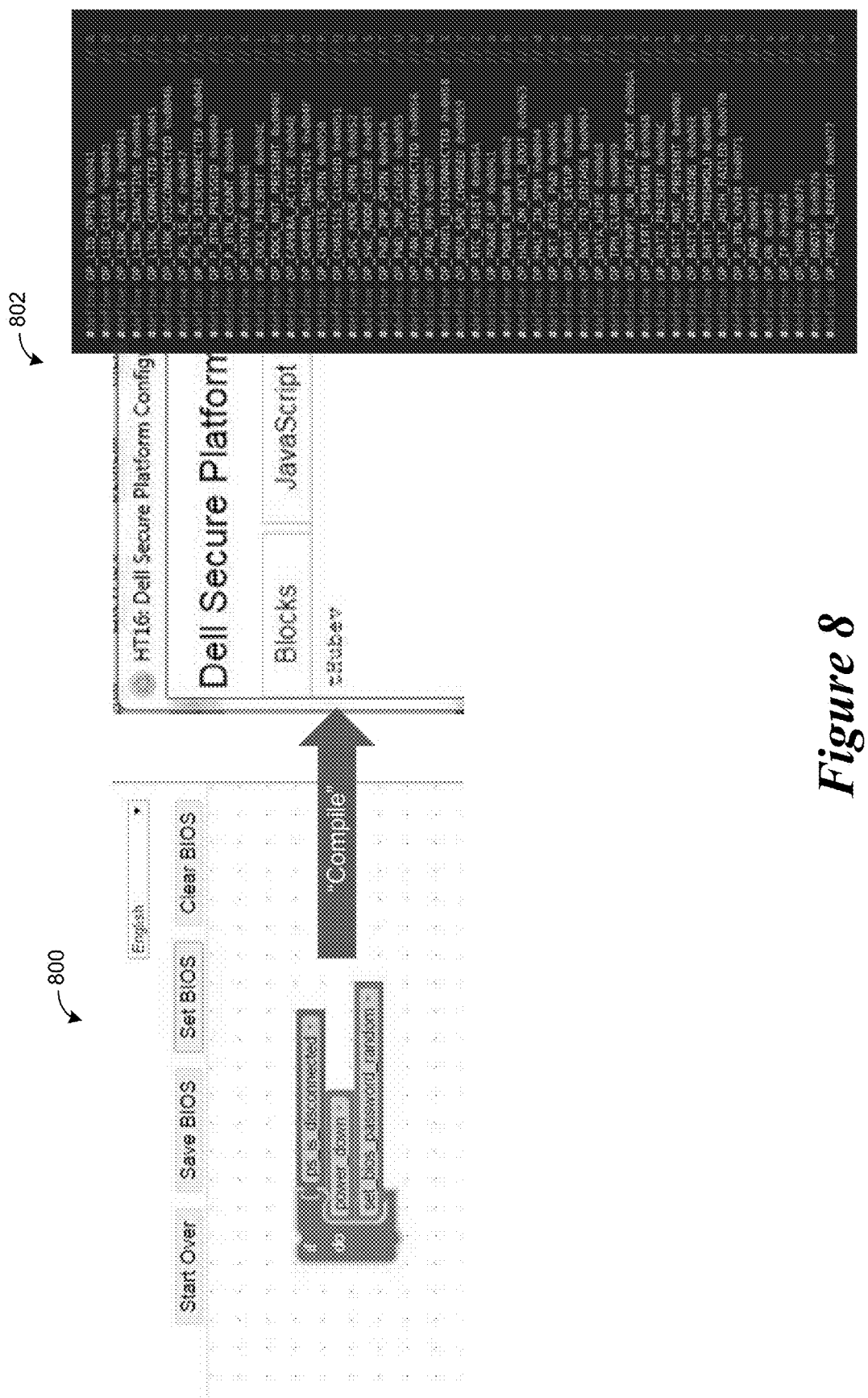
FIG. 8 shows example screen presentations of a platform security operation.

FIG. 8 shows example screen presentations 800, 802 of a platform security user interface. More specifically, policy logic of the policy injection module automatically converts a security policy generated via the platform security user interface into a string of operational codes (opcodes) which are then deployed to the BIOS 117 for storage, interpretation and enforcement by the BIOS 117. In certain embodiments, policy configuration module converts the visual security policy to a string of operational codes which include an ASCII string of operational codes.

Figure 9:
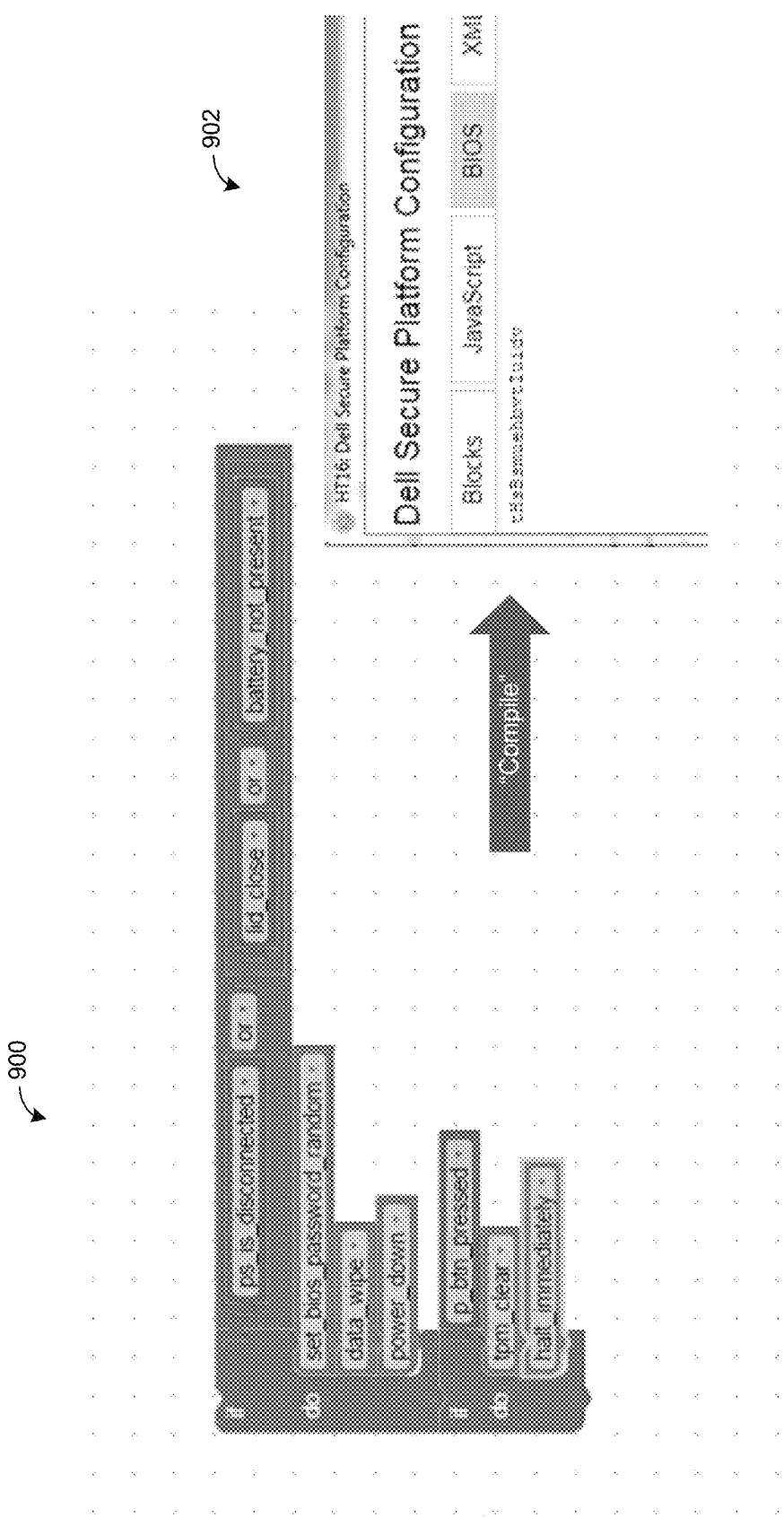
FIG. 9 shows example screen presentations of a platform security operation.

FIG. 9 shows example screen presentations 900, 902 of a platform security operation. More specifically, for more complex visual security policies the policy configuration module automatically converts the security policy to convert the security policy to readable code (e.g., JavaScript). In certain embodiments, the readable code comprises a string of operational codes (opcodes) which are deployed to the BIOS 117 for storage, interpretation and enforcement by the BIOS 117. Additionally, the policy configuration module presents a unique identifier which corresponds to the more complex visual security policy when the BIOS tab is selected.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a platform security operation, comprising:
    presenting a platform security user interface, the platform security user interface comprising a blocks tab, the blocks tab comprising a logic option, a triggers option and an actions option, the platform security user interface presenting a plurality of security blocks, each of the plurality of security blocks corresponding to a particular security policy function;
    configuring a visual security policy via the platform security user interface, the configuring comprising combining a set of the security blocks according to a desired security function, the combining being accomplished by selecting blocks presented via the platform security user interface;
    converting the set of security blocks of the visual security policy to information representing the security policy; and,
    deploying the security policy to an information handling system, the deploying comprising performing a policy injection operation, the policy injection operation being performed by a policy injection module, the policy injection operation injecting the security policy to a system of the information handling system, the system of the information handling system maintaining persistence of the security policy; and wherein
    the plurality of security blocks include trigger security blocks and action security blocks, the trigger security blocks and the action security blocks being selected from a pool of available triggers and actions for end user manipulation of the security policy.

2. The method of claim 1, wherein:
    the trigger security blocks and the action security blocks accessed via the logic option of the platform security user interface; and,
    the trigger security blocks and the action security blocks are visually presented as "if . . . do" type programming statements via the platform security user interface.

3. The method of claim 1, wherein:
    converting the set of security blocks provides scripting logic representing the security policy, the scripting logic being configured to be consumed by a low resource environment within the information handling system.

4. The method of claim 1, wherein:
    the deploying the security policy is via at least one of a variable methodology, an attribute methodology and a setting methodology.

5. The method of claim 1, wherein:
    the system of the information handling system comprises a basic input output system (BIOS); and,
    the security policy is injected to the basic input output system (BIOS) of the information handling system.

6. A system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executed by the processor and configured for: presenting a platform security user interface, the platform security user interface comprising a blocks tab, the blocks tab comprising a logic option, a triggers option and an actions option, the platform security user interface presenting a plurality of security blocks, each of the plurality of security blocks corresponding to a particular security policy function; configuring a visual security policy via the platform security user interface, the configuring comprising combining a set of the security blocks according to a desired security function, the combining being accomplished by selecting blocks presented via the platform security user interface; converting the set of security blocks of the visual security policy to information representing the security policy; and, deploying the security policy to an information handling system, the deploying comprising performing a policy injection operation, the policy injection operation being performed by a policy injection module, the policy injection operation injecting the security policy to a system of the information handling system, the system of the information handling system maintaining persistence of the security policy; and wherein the plurality of security blocks include trigger security blocks and action security blocks, the trigger security blocks and the action security blocks being selected from a pool of available triggers and actions for end user manipulation of the security policy.

7. The system of claim 6, wherein:
the trigger security blocks and the action security blocks accessed via the logic option of the platform security user interface; and,
the trigger security blocks and the action security blocks are visually presented as "if . . . do" type programming statements via the platform security user interface.

8. The system of claim 6, wherein:
converting the set of security blocks provides scripting logic representing the security policy, the scripting logic being configured to be consumed by a low resource environment within the information handling system.

9. The system of claim 6, wherein:
the deploying the security policy is via at least one of a variable methodology, an attribute methodology and a setting methodology.

10. The system of claim 6, wherein:
the system of the information handling system comprises a basic input output system (BIOS); and,
the security policy is injected to the basic input output system (BIOS) of the information handling system.

11. A non-transitory, computer-readable storage medium embodying computer program code, the computer program code comprising computer executable instructions when executed are configured for: presenting a platform security user interface, the platform security user interface comprising a blocks tab, the blocks tab comprising a logic option, a triggers option and an actions option, the platform security user interface presenting a plurality of security blocks, each of the plurality of security blocks corresponding to a particular security policy function; configuring a visual security policy via the platform security user interface, the configuring comprising combining a set of the security blocks according to a desired security function, the combining being accomplished by selecting blocks presented via the platform security user interface; converting the set of security blocks to information representing the security policy; and, deploying the security policy to an information handling system, the deploying comprising performing a policy injection operation, the policy injection operation being performed by a policy injection module, the policy injection operation injecting the security policy to a system of the information handling system, the system of the information handling system maintaining persistence of the security policy; and wherein the plurality of security blocks include trigger security blocks and action security blocks, the trigger security blocks and the action security blocks being selected from a pool of available triggers and actions for end user manipulation of the security policy.

12. The non-transitory, computer-readable storage medium of claim 11, wherein:
the trigger security blocks and the action security blocks are presented as "if . . . do" type programming statements.

13. The non-transitory, computer-readable storage medium of claim 11, wherein:
converting the set of security blocks provides scripting logic representing the security policy, the scripting logic being configured to be consumed by a low resource environment within the information handling system.

14. The non-transitory, computer-readable storage medium of claim 11, wherein:
the deploying the security policy is via at least one of a variable methodology, an attribute methodology and a setting methodology.

15. The non-transitory, computer-readable storage medium of claim 11, wherein:
the system of the information handling system comprises a basic input output system (BIOS); and,
the security policy is injected to the basic input output system (BIOS) of the information handling system.

16. The method of claim 5, wherein:
the security policy is injected to the basic input output system (BIOS) of the information handling system via at least one of a natively spawned option and a manual option, the policy being automatically injected into the BIOS with the natively spawned option, the policy being injected into the BIOS by importing a policy file with the manual option.

17. The method of claim 5, wherein:
the policy injection module includes at least one of a kernel mode driver and a BIOS access library.

18. The method of claim 5, wherein:
the BIOS includes a policy monitoring and enforcement portion, the policy monitoring and enforcement portion providing a manufacturer specific operation of a system management mode (SMM) of a uniform extensible firmware interface (UEFI).

\* \* \* \* \*